US011789252B1

(12) United States Patent
Hilby et al.

(10) Patent No.: US 11,789,252 B1
(45) Date of Patent: Oct. 17, 2023

(54) OPTICAL-INERTIAL STABILIZATION FOR ELECTRO-OPTICAL SYSTEMS

(71) Applicant: Lockheed Martin Corporation, Bethesda, MD (US)

(72) Inventors: Timothy Roland Hilby, San Mateo, CA (US); Jesse William Fisher, Boulder, CO (US); Luke L. Wieczorek, Erie, CO (US); Michael L. Tartaglia, Berthoud, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 457 days.

(21) Appl. No.: 17/060,794

(22) Filed: Oct. 1, 2020

(51) Int. Cl.
*G02B 26/08* (2006.01)
*G01M 11/08* (2006.01)
*G01C 19/5776* (2012.01)

(52) U.S. Cl.
CPC ..... *G02B 26/0816* (2013.01); *G01C 19/5776* (2013.01); *G01M 11/08* (2013.01)

(58) Field of Classification Search
CPC ........ G02B 26/0816; G02B 7/003–005; G02B 27/646–648; G01C 19/5776; G01M 11/08
USPC ................... 250/201.1, 203.1; 359/554–557
See application file for complete search history.

(56) References Cited

U.S. PATENT DOCUMENTS

| 7,227,111 B2 | 6/2007 | Eckelkamp-Baker et al. |
| 2002/0145102 A1* | 10/2002 | Eckelkamp-Baker ...................... G01C 15/002 250/203.1 |
| 2012/0049040 A1* | 3/2012 | King ...................... G02B 7/183 250/203.1 |
| 2018/0316862 A1* | 11/2018 | Miller .................. B60Q 1/0041 |

OTHER PUBLICATIONS

ATA Applied Technology Associates, "Optical Inertial Reference Unit," www.atacorp.com/optical_inertial_reference_unit.html, 3 pages, 2011.
Wikipedia, "Schiefspiegler," https://en.wikipedia.org/wiki/Schiefspiegler, 1 page, Oct. 7, 2019.

* cited by examiner

*Primary Examiner* — Kimberly N. Kakalec

(57) ABSTRACT

Provided herein are various improvements to optical-inertial stabilization systems, such as those employed on electro-optical systems that receive or emit optical energy. In one example, a system includes an optical reference element rigidly coupled to a primary mirror. The optical reference element propagates a reference signal through optic elements that form at least a portion of an optical path corresponding to the primary mirror. A measurement of the reference signal is made after propagation through the optic elements to determine errors associated with the optical path. The system can also include inertial sensors rigidly coupled to the primary mirror and optical reference element to form an assembly. The inertial sensors are configured to measure inertial rotation of the assembly. Rotational adjustments about two axes can be produced for the assembly based at least on the inertial rotation properties to correct for disturbance or drift.

20 Claims, 7 Drawing Sheets

OPTICAL-INERTIAL STABILIZATION FOR ELECTRO-OPTICAL SYSTEMS

GOVERNMENT RIGHTS STATEMENT

This invention was made with Government support under contract no. HQ0277-18-C-0001 awarded by Missile Defense Agency. The Government has certain rights in the invention.

TECHNICAL BACKGROUND

Various optical systems can be employed for sensing and directing of optical energy. For example, telescopes and other similar sensing devices can be employed to detect electromagnetic energy, such as light, from distant objects. Optical transmission devices can employ similar optical elements as sensing devices, but instead of receiving optical energy, these can direct optical energy to distant targets. Many of these optical systems include electronically controlled stabilization systems to affect pointing, orientation, and reduce jitter introduced into the optical system by external disturbances. These systems are referred to as electro-optical systems and can be employed in environments that have precise pointing and tracking requirements, such as in directed energy, optical communications, and remote sensing applications. Electro-optical systems often use a 'pseudo guide star' to stabilize the optical path. A pseudo guide star is an inertially stabilized optical reference that transits 'common path, common mode' optics, inheriting jitter and pointing errors along the path through the optics, and enables sensors at the back end of the optical path to measure and quantify these pointing errors. Detection of pointing errors can be used to control fast steering mirrors and other active or adaptive optics to correct and inertially stabilize an optical line of sight.

One example of an optical-inertial stabilization technique with a pseudo guide star involves an inertially stabilized platform with a laser source nominally directed into but structurally decoupled from the entrance aperture of an optical system, such as a primary mirror. To inject the inertially stabilized laser source into the entrance aperture of the electro-optical system, an extended retroreflector optic mounted in front of the primary mirror is typically used. The inertially stabilized laser beam retroreflects into the primary mirror and transits the optical path of the electro-optical system. Optical sensors in the back end of the optical system are employed to measure the relative motion between the optical axis of the electro-optical system and the inertially stabilized laser source (i.e. the pseudo guide star). However, the extended retroreflector optic and its supporting structure is optically and mechanically complex, partially obscures the primary mirror aperture and may require additional clear apertures on multiple optics along the entire optical path. This can lead to the need for complex component design, manufacturing, assembly, and alignment.

OVERVIEW

Provided herein are various improvements to optical-inertial stabilization arrangements employed in electro-optical systems that receive or emit optical energy and have precise pointing requirements, such as in directed energy, optical communications, and remote sensing. The examples herein relate to a 'strapdown' inertial reference transfer unit that integrates inertial rotation sensors and an optical reference beam with a primary optic into a passively and actively stabilized structure. This strapdown arrangement results in a cheaper, smaller, lighter, and more agile optical-inertial pointing system, which can be accurate into the microradian ($\mu$rad) regime. Moreover, the examples herein eliminate a separate optical-inertial reference platform along with extended retroreflector optics. Weight and supporting structures associated with the separate optical-inertial reference platform and extended retroflector are reduced as well as any mass counterbalances required to balance the pointing system. The position sensors and actuators associated with a separate optical-inertial reference platform are also eliminated, further reducing weight, structure, and associated electrical interconnects which can introduce parasitic torques on the pointing system.

In one example implementation, a system includes a primary mirror configured to direct an optical beam, and an optical reference element rigidly coupled to the primary mirror. The optical reference element is configured to propagate a reference signal through optic elements that form at least a portion of an optical beam path including the primary mirror. A measurement system is configured to perform a measurement of the reference signal after propagation through the optic elements to determine an optical beam error associated with the optical beam path. The system can include inertial sensors rigidly coupled to the optical reference element and the primary mirror to form an assembly, where the inertial sensors are configured to measure inertial rotation properties of the assembly. A control system determines rotational adjustments to correct for disturbance or drift of the assembly based at least on the inertial rotation properties. An adjustment mechanism produces the rotational adjustments of the assembly about at least two axes orthogonal to an optical axis associated with the primary mirror.

In another example implementation, a method includes emitting a reference signal by an optical reference element through optic elements that form at least a portion of an optical beam path corresponding to a primary mirror, where the optical reference element is rigidly coupled to the primary mirror. The method also includes determining an optical beam error associated with the optical beam path based at least on measurement of the reference signal after propagation through the optic elements. The method can include measuring inertial rotation properties of an assembly comprising the optical reference element and the primary mirror with inertial sensors rigidly coupled to the assembly and determining rotational adjustments to correct for disturbance or drift of the assembly based at least on the inertial rotation properties. Rotational adjustments of the assembly can be produced about at least two axes orthogonal to an optical axis associated with the primary mirror.

In yet another example implementation, an optical-inertial stabilization system includes a rotationally suspended assembly comprising an optical reference element, inertial sensors, and a primary optic configured to direct an optical beam. The optical reference element is configured to propagate a reference signal through optic elements that form at least a portion of an optical beam path corresponding to the primary optic. The inertial sensors are configured to measure inertial rotation properties of the rotationally suspended assembly. Rotationally compliant mounts are coupled to the rotationally suspended assembly and are configured to passively attenuate rotational disturbances above a threshold frequency experienced about two axes orthogonal to an optical axis associated with the primary optic. A measurement system is configured to perform a measurement of the reference signal after propagation through the optic elements to determine an optical beam error associated with the optical beam path. An optical control system is configured to adjust at least one of the optic elements among the optical beam path based on the measurement of the reference signal. An inertial control system is configured to determine rotational adjustments to correct for disturbance or drift of the rotationally suspended assembly based at least on the inertial rotation properties. An adjustment mechanism is configured to produce the rotational adjustments of the rotationally suspended assembly about the two axes.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
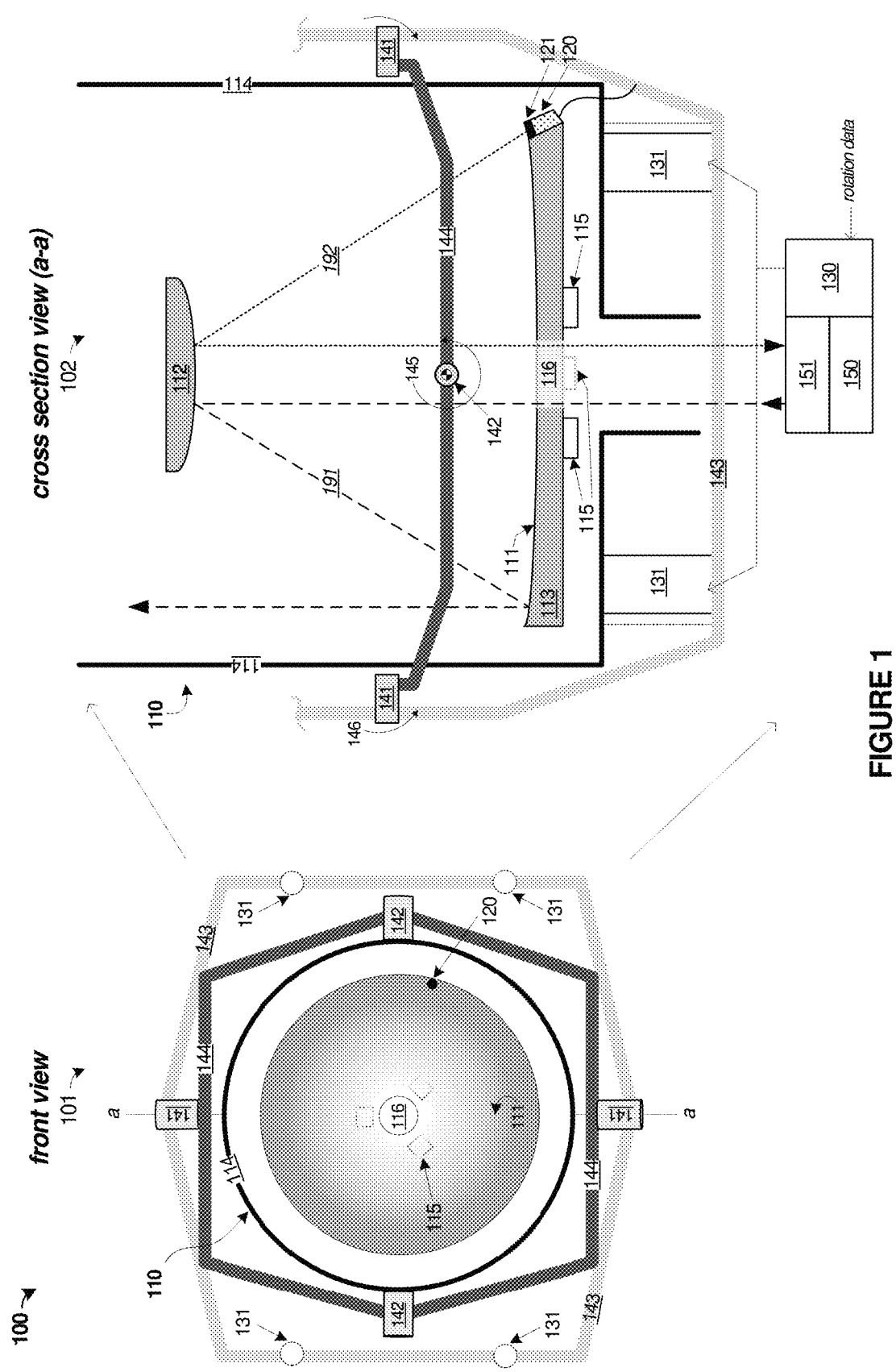
FIG. 1 illustrates a stabilized optical system in an implementation.

Optical systems can be employed for sensing incoming optical energy and directing outgoing optical energy. For example, telescopes and camera devices outfitted with mirror systems (reflecting) or lens systems (refracting) can be employed to observe incoming electromagnetic energy, such as light, from distant objects. Directed energy systems can employ similar optical elements as sensing devices, but instead of only receiving optical energy, these can also direct locally sourced optical energy to distant targets. A large quantity of arrangements and configurations of optical systems have been developed, and each can have advantages based on optical properties inherent to those arrangements and configurations. For example, some systems employ mirrors to direct optical energy, while others employ lenses. Some systems employ a combination of optic elements, with various structures formed to house the optic elements for structural rigidity, portability, and protection from external optical and particulate contamination.

Although many different types of telescopes and corresponding directed energy arrangements have been developed, one such type includes the Cassegrain family of reflector arrangements. Cassegrain arrangements can include a primary mirror and a secondary mirror positioned in relation to the primary mirror. When receiving inbound optical energy, the primary mirror directs optical energy to the secondary mirror, which further directs the optical energy to additional optics for detection. When directing outbound optical energy, the secondary mirror directs optical energy to the primary mirror, which further directs the optical energy to a target. Various offsets between the primary mirror and secondary mirror can be established, such as in Schiefspiegler variants of the Cassegrain, to provide for different physical packaging, as well as slightly different optical characteristics and performance. Moreover, the primary mirror may include an aperture through which optical energy can pass before/after the secondary mirror, depending upon the optical direction.

Many of these optical systems include a structure to carry the primary optical element, such as primary mirror, and provide for pointing of the primary mirror with regard to a target object or target orientation. Although a housing might be included around some of the optical elements, this housing is not required for many systems, or the housing may comprise elements of a vehicle, building, or other related structure. Pointing or aiming of the primary optical element can be challenging, especially in mobile environments. Vibrations as well as errors induced by relative movement among optical elements can limit the effectiveness of pointing systems and focusing systems. To address these concerns regarding pointing and stabilization, some optical systems include electrically controlled stabilization systems to affect pointing, orientation, or stabilization of various optical elements. These systems are referred to as electro-optical systems and can be employed in environments that have precise pointing requirements, such as in directed energy devices, optical communications, and remote sensing. Electro-optical systems often use a 'pseudo guide star' to stabilize primary optical components. A pseudo guide star employs an inertially stabilized optical reference signal that transits 'common path, common mode' optics, inheriting jitter and pointing errors along the path through the optics, and enables sensors to quantify these pointing errors. Detection of pointing errors can be used to control fast steering mirrors and other active or adaptive optics to stabilize optical line of sight. However, as discussed above, pseudo guide star systems often employ an extended retroreflector.

Discussed herein are enhanced inertial-optical stabilization systems for electro-optical systems that rigidly couple at least a primary optic to an optical reference element and inertial sensors, forming a combined assembly. In this manner, features of a pseudo guide star can be provided to an electro-optical system without the usage of an extended retroreflector system. In the examples herein, an optical reference element and inertial sensors are provided for pointing control and line-of-sight stabilization for electro-optical systems such as those used for directed energy, optical communications, astronomical instruments, and remote sensing. The examples herein integrate an optical reference element and inertial rotation sensors with an optical system to form an assembly that can be mounted on a torsional spring flexure system to provide isolation in two degrees of freedom nominally orthogonal to the optical axis of the assembly, while allowing actuators to act upon the assembly. Actuators can act upon the assembly and provide pointing control in the flexural degrees of freedom. The optical reference element and inertial rotation sensors are mounted to the assembly and are tightly or rigidly coupled to the primary optic (and to each other) such that they measure the inertial rate of the primary optic.

An optical reference beam produced by the optical reference element can be injected into the primary optic of the optical system using beam injection optics. The optical reference beam traces the optical path through the optical system and downstream optics associated with the primary optic. This enhanced approach allows the direct injection of an optical reference beam at the edge of (or through) the primary optic using a formatting lens that can emulate the focus (or more generally the prescription) of the primary optic. Other mounting configurations for an emitter of the optical reference beam can be employed such that the optical reference beam backpropagates through optic elements downstream of the primary optic or mirror in a double-pass arrangement. The optical reference beam provided by an optical reference element that is coupled to the assembly is imaged in the downstream optics. Since the optical system primary optic is inertially stabilized by the passive isolation and active inertial rate control, measurements of the optical reference beam image in the downstream optics represent angle perturbations in the optical path between the primary optic and all downstream optics. This will not only include errors in the pointing control system, but also distortions in the optical path due to vibration and thermal drift. This signal may be further utilized by the pointing control system to inertially stabilize pointing, and this may be achieved with small fast steering mirrors or other backend actuators.

A rotational isolation system is included to mount the assembly and provide rotational compliance and passive high frequency rejection of angular disturbances for the assembly. In order to avoid coupling linear vibrations into angular disturbances on the assembly, the center of support of the rotational isolation system can be configured to coincide with the center of mass of the supported assembly. Inertial rate sensors are used as feedback in an inertial rate control loop (closed above the system rotational isolation frequency) to actively reject pointing drift and disturbances at low frequencies. The combination of passive stabilization from the rotational isolation system and active isolation from the inertial rate control of the assembly provides an inertially stable optical reference beam that traces the optical path and may be used to correct jitter or drift in optics downstream from the primary optic. The inertial rate error in the rate control loop may be integrated and used to further provide feedforward pointing corrections to a fast steering mirror or other high bandwidth pointing control actuators in the downstream optics. The integrated inertial angle error may be developed as part of the rate control compensator if the loop is type II or higher. Typically, the assembly will be mounted to some type of gross mount pointing system which will provide large field-of-regard pointing and offload for large angular disturbances. Angle position sensors, such as non-contact encoders or differential displacement sensors, may be used to measure the relative position between the assembly and the gross pointing control system. For large angular perturbations, gross pointing control may be realized by a gimbaled platform or coudé path gimbals that follow the assembly using the above angle position sensors keeping the relative angles small.

Turning now to a first example configuration of the enhanced electro-optical stabilization techniques, FIG. 1 is presented. FIG. 1 illustrates a stabilized electro-optical system 100 in an implementation. FIG. 1 includes two views 101-102 of system 100, with view 101 illustrating a front view and view 102 illustrating a cross-sectional side view (through section a-a shown in view 101). System 100 includes assembly 110 mounted to a flexure/gimbal system comprising elements 141-144. Assembly 110 includes primary optic 111, secondary optic 112, structure 113, housing 114, inertial sensors 115, and aperture 116. Assembly 110 also comprises optical reference element 120 that is rigidly coupled to structure 113 along with primary optic 111. In some examples, primary optic 111 itself forms structure 113, with optical reference element 120 mounted to an edge of primary optic 111.

System 100 might comprise a telescope or other optical monitoring apparatus used to detect optical signals or optical energy from distant objects and locations. System 100 might instead comprise an optical emitter apparatus, such as an optical communications device, directed energy weapon, optical scanning device, projector, or other similar device. The optical configuration of system 100 can take various forms depending upon the specific telescope or optics type selected, which is represented by a Cassegrain type in FIG. 1. Elements of system 100 can be mounted to various external structures, such as buildings, observatories, vehicles, aircraft, watercraft, chassis, cases, user devices, spacecraft, satellites, probes, or other similar devices and structures. Thus, the size and scale of system 100 can vary depending upon the implementation. Although the size of structural and optical elements of system 100 can affect stability parameters, control schemes, and structural rigidity, the enhanced techniques herein can apply to a wide range of sizes and scales of structural and optical components.

In operation, optical energy, such as light, can be emitted or received by optic elements of assembly 110. Taking the example of emission, optical energy in the form of a laser beam, can be generated by a laser source (not shown in FIG. 1) and directed by optic elements 151 through aperture 116 of primary optic 111. This beam is incident onto secondary optic 112 which comprises a convex shape and spreads the beam onto primary optic 111. Primary optic 111 then directs the beam outward along an optical axis for exit from housing 114 and towards a target, as shown by example light path 191. A similar operation in reverse occurs for reception or monitoring of optical energy emitted or reflected by distant objects.

To aim or point assembly 110, and by extension primary optic 111, various mechanisms can be employed. The movement of assembly 110 can take two forms, gross movement for pointing or orienting toward a target, and stabilization movement for correcting for bias, drift, or disturbances on this gross pointing. Thus, the movement can orient or point an output beam of system 100 to intercept a target, or to view a particular target while providing an inertially stabilized platform. Gross movements of system 100 are not discussed herein but can be provided by any known targeting or pointing control system. Corrections to the errors in gross movements for stabilization and drift/disturbance correction can be achieved using the mechanisms discussed herein. For example, FIG. 1 shows a gimbal-style of mechanism. This mechanism can move assembly 110 comprising primary optic 111 about at least two axes via gimbal links 143-144 and rotationally compliant mounts 141-142. Rotationally compliant mounts 141-142 may include torsional spring flexure components that allow some angular motion of assembly 110 and provide passive angular disturbance isolation at high frequencies in at least two degrees of freedom nominally orthogonal to the "boresight" of assembly 110. The term boresight generally refers to the optical axis for primary optic 111, which in this example also transits through aperture 116. Furthermore, to reduce coupling of linear vibrations into angular disturbances on assembly 110, the center of support for mounts 141 and 142 is configured to coincide with the center of mass for assembly 110, as shown in FIG. 1. Motors or actuators 131 can act on housing 114 of assembly 110 for movement of assembly 110 and primary optic 111.

However, vibrations and mechanical errors in pointing mechanisms can lead to pointing errors, drift, disturbances, and jitter for primary optic 111 and the beam carried by primary optic 111. These errors can result in decreased efficiency, reduced ability to aim accurately and to image target objects, among other undesirable effects depending upon the application. As mentioned above, extended retroreflector systems can be employed to direct a reference beam back through optic elements to inherit some optical beam errors and jitter. This process can be referred to as backpropagation. Once detected after backpropagation, measurements of the reference beam can direct stabilization efforts provided by the various optics and mechanisms related to the optical system. However, the extended retroreflector requires additional apertures/optics and typically obscures a portion of the clear aperture (emitted or received) of the primary optic, which reduces the light-gathering or light-emitting efficiency of the system. Additionally, any extended retroreflector optics do not correspond to a primary optical path, and in turn can contribute corresponding parasitic errors.

In FIG. 1, an enhanced reference beam is employed, notably optical reference element 120 mounted to an edge of primary optic 111. Optical reference element 120 emits a beam of optical energy, such as a laser beam, along path 192. This path directs the beam onto secondary optic 112 for backpropagation through aperture 116 and through optic elements 151, which are all associated with the beam path for primary optic 111. The reference beam emitted by optical reference element 120 is measured after backpropagation, and from these measurements, optic control system 150 can determine corrections to the primary beam to be implemented using fast steering mirrors included in downstream optic elements 151 associated with primary optic 111. Moreover, since optical reference element 120 is part of assembly 110, stabilization corrections to assembly 110 that affect primary optic 111 also affect optical reference element 120. A least a portion of these stabilization corrections can be provided by actuators 131, which can provide multi-axis manipulation of assembly 110 for altering a rotation of primary optic 111.

Optical reference element 120 is mounted along with primary optic 111 to a shared structure, namely structure 113, which forms a tightly coupled arrangement comprising assembly 110. Assembly 110 might also be referred to as an optical-mechanical assembly or rotationally stabilized assembly, among other designations. Examples of structure 113 can comprise various support members, such as truss members, strut members, ribbed/honeycomb structures, or other support members and arrangements. In some instances, primary optic 111 and structure 113 are formed from different materials and coupled or bonded together. In other instances, a common material forms both the body of primary optic 111 and structure 113, such as when primary optic 111 and structure 113 are machined from the same piece of material. Regardless of the type of structure employed for primary optic 111, optical reference element 120 is rigidly mounted to or formed into such structure. Thus, optical reference element 120 and primary optic 111 comprise the same inertially-stabilized and inertially-referenced platform as structure 113, and optical reference element 120 behaves as a rigid-body extension of primary optic 111. Due in part to the tight mechanical coupling between primary optic 111, optical reference element 120 and inertial sensors 115, inertial rotation measurements made by inertial sensors 115 can also directly measure the inertial rotation properties of primary optic 111 and optical reference element 120.

FIG. 1 shows optical reference element 120 mounted at an edge along the perimeter of primary optic 111. Optical reference element 120 thus emits a reference beam along path 192 from an outer edge of primary optic 111. In other examples, optical reference element 120 might be mounted more towards a middle/center of primary optic 111 or might include multiple optical reference elements distributed over the area of primary optic 111. A portion of primary optic 111 might be drilled, etched, machined, or otherwise removed for placement of optical reference element 120. Primary optic 111 may instead have semi-transparent or one-way transmissive portions thereof, to allow mounting of optical reference element 120 behind reflective portions of primary optic 111 while providing for emission of the reference beam through primary optic 111.

When more than one optical source is included, averaging or other techniques can be employed to further provide more precise characterization of the optical path of the main beam of primary optic 111, as well as characterize distortions in primary optic 111 itself. The use of multiple optical reference elements for multiple reference beams might reduce the stiffness requirements for structure 113 or primary optic 111 as fluctuations in the shape of structure 113 or primary optic 111 can be detected and characterized.

Optical reference element 120 also includes beam injection optics comprising formatting lens 121. Formatting lens 121 comprises an optical element configured to modify focus of an emitted reference beam. In many instances, formatting lens 121 comprises a convex lens that focuses a reference beam emitted by a laser comprising optical reference element 120. Formatting lens 121 can be configured to mimic the focal power of primary optic 111 and is prescribed/adjusted to achieve the same de-magnification of primary optic 111. Formatting lens 121 might comprise a beam expander that serves to establish a beam size and rate of divergence. Specifically, the reference beam associated with optical reference element 120 is convergent when it exits formatting lens 121 and appears to be focused at the far field. Advantageously, the use of optical reference element 120 with formatting lens 121 can emulate a pseudo guide star located at 'infinity' when the optical primary reference assembly 110 is inertially stabilized (using inertial sensors 115, actuators 131, and mounts 141 and 142) while eliminating the need for an extended retroreflector system. The reference beam emitted by optical reference element 120 appears as if it has been received from a distant object that is reflected by primary optic 111. Thus, the reference beam follows the pointing of primary optic 111, and any distortion in the downstream optical path caused by relative motion of downstream optic elements 151, along with secondary optic 112, can be measured with the reference beam. These measurements of the reference beam will necessarily be with respect to primary optic 111, due to the rigidity of the coupling between primary optic 111 and optical reference element 120.

In addition to the rigid coupling of primary optic 111 to optical reference element 120, one or more inertial sensors 115 are also tightly coupled to the optical reference element and included on structure 113. In FIG. 1, these inertial sensors 115 are shown mounted to structure 113 and oriented about aperture 116 of primary optic 111. As with optical reference element 120, inertial sensors 115 and primary optic 111 comprise the same assembly 110, and inertial sensors 115 behave as a rigid-body extension of primary optic 111. Inertial sensors 115 are a part of an inertial stabilization system for primary optic 111, measure rigid body rotations of primary optic 111, and provide feedback for rate loop pointing control of the primary optic 111, and by extension, structure 113, housing 114.

System 100 includes inertial control system 130 which can receive inertial rotation measurements from inertial sensors 115 to determine rotation adjustments for assembly 110. Inertial control system 130 can command actuators 131 to produce corresponding actuation of assembly 110. This actuation stabilizes assembly 110 to correct for rotational disturbances and drift. Inertial control system 130 employs measurements from inertial sensors 115 to characterize the inertial state of assembly 110. From this inertial state, inertial rotation rates can be derived and adjustments to the pointing or positioning of primary optic 111 can be made. These adjustments can be made using one or more among actuators 131. Four actuators 131 are positioned in FIG. 1 to effect pointing alterations in two axes for primary optic 111. It should be understood that a different number and different positioning of actuators 131 is possible to achieve similar effects.

Advantageously, the enhanced arrangement described in FIG. 1 can reduce the weight and required support structure for an electro-optical system, as well as eliminate the usage of a separate and separately inertially stabilized optical reference assembly whose interconnects might also introduce unwanted parasitic torques onto a primary optic. Usage of mass counterbalances required to balance an electro-optical system can also be reduced or eliminated. The combination of passive isolation from the flexure isolation system provided by mounts 141-142, as well as the active isolation provided by inertial rate control of assembly 110 provides an inertially stable optical reference beam that back traces the optical path that mimics the boresight of the primary optic 111. This inertially stable optical reference beam can be used to correct jitter or drift in optics downstream (151) from primary optic 111. Moreover, since primary optic 111 is inertially stabilized by the passive isolation (e.g. flexure mounts) and active inertial rate control (e.g. inertial control system 130 and actuators 131), measurements of the reference beam produced by optical reference element 120 in downstream optic elements 151 represent inertially referenced pointing angle perturbations in the optical path between primary optic 111 and all downstream optic elements 151 transited by the reference beam. These measurements of the reference beam will include errors in the gross pointing of system 100 and also distortions due to vibration and thermal drift in the optical path that feeds primary optic 111 which can include secondary optic 112.

Returning to the elements of FIG. 1, primary optic 111 with aperture 116 is coupled to (or forms) structure 113. A Cassegrain type of arrangement is shown in FIG. 1, and primary optic 111 can comprise a reflector or mirror in such arrangements. Primary optic 111 might be formed from a substrate coated in reflective material, or may instead be formed from a reflective material, such as milled, printed, or etched from a metal or metallic compound. Front-reflecting or rear-reflective mirrors and coatings can be employed. Primary optic 111 might instead comprise a primary lens group which is one or more rigidly coupled refractive elements (e.g. lenses), depending upon the type and configuration of telescope or optical arrangement desired. Structure 113 may be formed from the same material as primary optic 111 or may instead house or be coupled to primary optic 111 to form a unified structure. Structure 113 may include various ribs, struts, trusses, meshes, honeycombs, or other structural features. Primary optic 111 also includes aperture 116 which is cut or formed into the optical surface of primary optic 111. Other optical arrangements or telescope types might include various optical offsets which eliminate the need for an aperture or include a different shape or size of aperture. Structure 113 might include the aperture as well or may have structural elements that reside within the optical pathway of aperture 116.

Secondary optic 112 comprises a mirror in this example and is positioned to reflect light onto primary optic 111 when in the light emission configuration. Secondary optic 112 is positioned to reflect light received from primary optic 111 through aperture 116 when in the light reception configuration. Secondary optic 112 can be skewed, tilted, or offset in other examples that do not employ aperture 116 to reflect light past a perimeter of primary optic 111. In further configurations and telescope types, secondary optic 112 might comprise one or more refractive elements (e.g. lenses). Secondary optic 112 might comprise a substrate coated in reflective material, or may instead be formed from a reflective material, such as milled, printed, or etched from a metal or metallic compound. Front-reflecting or rear-reflective mirrors and coatings can be employed. Although shown as separate from optic elements 151 in FIG. 1, secondary optic 112 might be considered inertially a part of assembly 110 but optically as a part of the downstream optics and included in the discussion of optic elements 151. Other optical/inertial configurations are possible for secondary optic 112.

Housing 114 might comprise various chassis, cases, tube elements, structural elements, vehicle elements, or building elements that encase portions of system 100, such as primary optic 111 and secondary optic 112. In addition, housing 114 provides structural support to primary optic 111 and secondary optic 112. Housing 114 can be rigidly coupled to primary optic 111 to form a part of assembly 110. Housing 114 might comprise various materials, fasteners, and structural elements, and can be formed from metal, metallic, composite materials, carbon-fiber reinforced composites, wood, polymers, or other similar materials, including combinations thereof. Typically, the selected materials will be opaque, absorbing, or reflective to the particular frequency of optical energy relevant to the measured or emitted optical energy. Various baffling or rib elements may be included along the walls of housing 114. Various transparent or semi-transparent apertures and windows might be included as well, such as to reduce the effect of weather, moisture intrusion, wildlife, dust, or other contaminants.

Housing 114 is coupled to a gimbal arrangement that allows rotations of housing 114 orthogonal to the optical axis and is formed from elements 141-144. In FIG. 1, housing 114 is coupled to mounts 142 which are in turn coupled to gimbal link 144. Gimbal link 144 is coupled to mounts 141 which are in turn coupled to gimbal link 143. Gimbal link 143 might be coupled to a base, such as included on an aircraft, spacecraft, building, or other vehicular or stationary mount. Mounts 141-142 comprise torsional spring flexure elements, as well as associated bearings, housings, and couplers. Torsional spring flexure elements can provide for spring-restrained movement along a particular rotation axis or set of axes, while limiting movement or restricting movement in the linear axes. In the example of FIG. 1, mounts 141 allow for spring-restrained rotation about axis 146 of mounts 141 while restricting linear movement along axis 146 as well as movement in other axes. Likewise, mounts 142 allow for spring-restrained rotation about axis 145 of mounts 142, while restricting linear movement along axis 145 as well as movement in other axes. Thus, mounts 141-142 tend to attenuate disturbances at frequencies above the natural frequency of the suspension system and provide stability to housing 114 and assembly 110.

Inertial sensors 115 comprise various types of sensors configured to detect orientation or rotations about one or more axes. Inertial sensors 115 might comprise fiber optic gyroscopes (FOGs). Other examples might include micro-electro-mechanical systems (MEMS)-based inertial rotation sensors, mechanical gyroscopes, star trackers, vision-based sensors, accelerometers, inclinometers, photonic integrated circuit (PIC) based optical ring gyroscopes, or other suitable sensor technologies. In FIG. 1, at least two sensors are included which each sense rotation about a corresponding axis. Three orthogonal sensors are typically used in order to sense the full rotation rate vector. From the three sensors, two rotational rate measurements orthogonal to the optical axis are determined, from which the inertial control system 130 can determine a pointing or inertial state of primary optic 111. Inertial sensors 115 might be arranged about aperture 116. However, when an aperture is not included in primary optic 111, then inertial sensors 115 can be coupled to other locations of primary optic 111.

Inertial control system 130 is configured to receive rotation data or orientation information over corresponding links from inertial sensors 115. Inertial control system 130 can comprise transceivers to communicate with inertial sensors 115, and actuator control circuitry to command/control actuators 131 in order to inertially stabilize assembly 110. Optics control system 150 includes, or is communicatively coupled to, sensors that measure or image reference beam 192 after propagation through optic elements 151. Position/walk and angle sensors can measure corresponding perturbations of reference beam 192. Measurements from these sensors can be utilized to determine path errors in optic elements 151 and secondary optic 112. Optics control system 150 can determine adjustments to the optical path to correct for at least a portion of these path errors and instruct optical adjustment elements to make such adjustments. These optical adjustment elements can include fast steering mirrors, among other beam steering elements.

Inertial control system 130 and optics control system 150 can be included in similar circuitry, processors, and software elements to form a unified control system. Inertial control system 130 and optics control system 150 can include various circuitry, logic, processing elements, memory elements, storage elements, and communication interfaces. Inertial control system 130 and optics control system 150 can comprise one or more microprocessors, microcontrollers, field-programmable gate arrays (FPGAs), application specific integrated circuits (ASICs), discrete logic, or other elements. Inertial control system 130 can be implemented within a single processing device but can also be distributed across multiple processing devices or sub-systems that cooperate in executing program instructions. Examples of inertial control system 130 and optics control system 150 include general purpose central processing units, application specific processors, and logic devices, as well as any other type of discrete circuitry, control logic, or processing device, including combinations, or variations thereof. Inertial control system 130 and optics control system 150 might include or might be coupled to one or more analog-to-digital conversion units to convert sensor data from an analog format into a digital format. Inertial control system 130 and optics control system 150 might include one or more network interfaces, RF interfaces, or optical interfaces for communicating over associated links.

Actuators 131 are configured to produce moments or movements in the positioning of primary optic 111 by exerting moments onto assembly 110 via gimbal links 143-144. Housing 114 is mounted on rotationally compliant mounts 141 and 142, and can be moved about corresponding rotational axes 145-146 by actuators 131. The mounts are configured such that the rotational axes pass through the center of mass. In some examples, actuators 131 comprise non-contact actuators that exert moments through electromagnetic forces without mechanical contact with gimbal links 143-144, or with minimal contact. Non-contact actuators provide movement of gimbal links 143-144 and consequently housing 114 (or assembly 110) without back-transmitting vibrations of housing 114 through the actuators. Non-contact actuators might have a first portion coupled to gimbal links 143-144 and a second portion coupled to a motive force source, and the first portion and second portion couple movement without contact using changing electromagnetic fields. Non-contact actuators also avoid the use of linkages, gears, and other mechanical features to couple force which have inherent vibration transmission properties or undesirable properties such as thrashing, backlash, or play which can adversely degrade inertial stabilization of primary optic 111. Non-contact actuators can comprise voice coil actuators. Other actuators might instead be employed, such as brushless DC motors, and others.

Rotationally compliant mounts 141-142 comprise passive isolation mounts that attenuate vibrations above a particular frequency. In some examples, mounts 141-142 comprise passive torsional spring flexures which provide high-frequency rejection of rotational disturbance. Other examples may have mounts 141-142 comprising air bearings, magnetic bearings, or other elements. The amount of compliance given by mounts 141-142 allows for movement of housing 114 (or assembly 110) within a certain limited angular range (usually about a degrees or so about axes 145-146) by way of actuators 131 while still rejecting rotational disturbances above a particular frequency, typically 1-20 Hertz (Hz).

Figure 3:
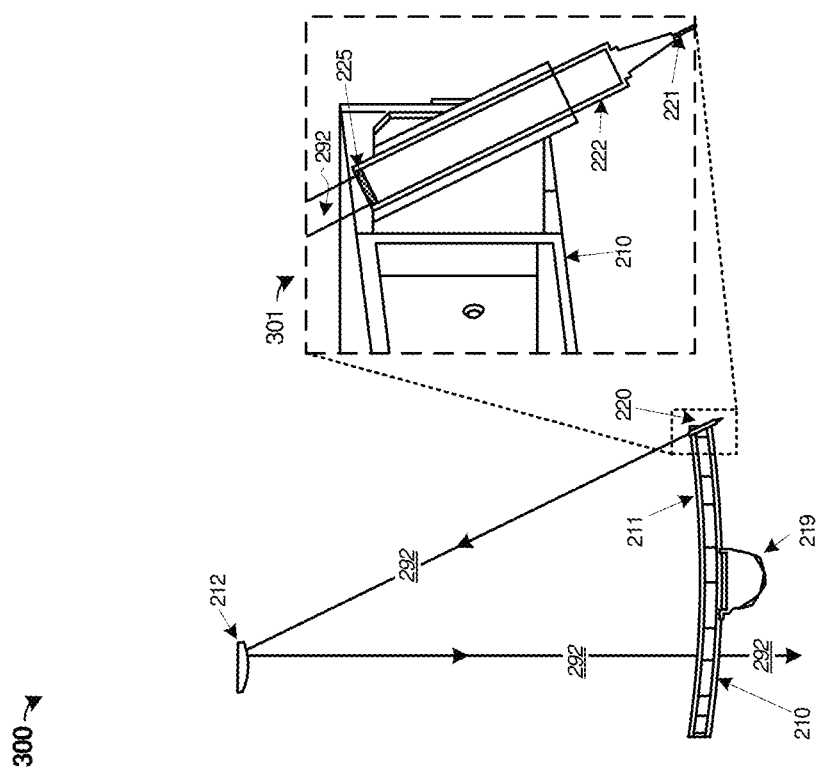
FIG. 3 illustrates an optical element arrangement in an implementation.
Figure 2:
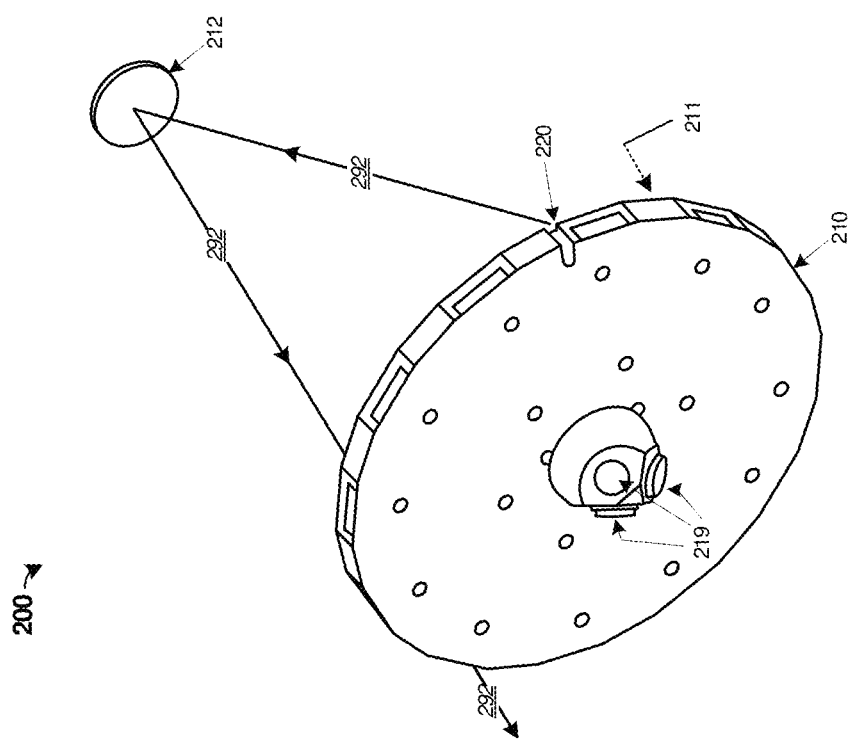
FIG. 2 illustrates an optical element arrangement in an implementation.

Turning now to a more detailed discussion on the structural arrangement of the primary/secondary optics with regard to a reference beam produced by an optical reference element, FIGS. 2 and 3 are presented. FIG. 2 illustrates a perspective view of an arrangement of primary mirror 211 in relation to secondary mirror 212 and an optical reference element. FIG. 3 shows a detailed view of the mounting of an optical reference element, along with a section view of the primary/secondary mirrors. The arrangement between primary mirror 211 and secondary mirror 212 in FIGS. 2-3 have a lateral offset between primary mirror 211 and secondary mirror 212. Thus, primary mirror 211 does not include an aperture as found in the examples in FIG. 1. Instead, for emission examples, optical energy of a main beam is directed from downstream optics to secondary mirror 212 and onto primary mirror 211, and the optical energy is directed from the downstream optics onto secondary mirror 212 from an angle that avoids primary mirror 211 before incidence onto secondary mirror 212. The optical properties and positioning of secondary mirror 212 allow for direction of the optical energy of the main beam onto primary mirror 211, and then primary mirror 211 directs the optical energy outward towards a target avoiding secondary mirror 212. Similar configurations are employed for reception of optical energy. Thus, the arrangement in FIGS. 2-3 might comprise an off-axis or oblique mirror arrangement, such as a Schiefspiegler arrangement, or other variants.

Turning first to FIG. 2, view 200 includes primary mirror 211 with structure 210, which is positioned in relation to secondary mirror 212. In this example, primary mirror 211 and structure 210 are effectively the same. Inertial sensors 219 are mounted onto a back side of structure 210, opposite to primary mirror 211. Structure 210, primary mirror 211, inertial sensors 219, and the optical reference element form an assembly. Inertial rotation sensors 219, such as three indicated in FIGS. 2-3, sense rotation about three corresponding axes. These measurements can be resolved into the two axes orthogonal to the optical axis by linear transformation. Notch 220 is formed into structure 210 and primary mirror 211, along the perimeter of structure 210. An optical reference element, such as reference laser output and associated elements, can be mounted into notch 220. When installed, the optical reference element can emit reference beam 292 onto secondary mirror 212 for backpropagation through a set of downstream optics for the optical system. The perspective of FIG. 2 shows reference beam 292 originating from notch 220 and, after reflection by secondary mirror 212, backpropagating past primary optic 211 and into downstream optics. In this example, reference beam 292 is not incident onto primary mirror 211.

Turning now to FIG. 3, view 300 includes a section view of primary mirror 211 with structure 210, which is positioned in relation to secondary mirror 212. View 300 also includes detailed view 301, which shows a close-up section of notch 220 with an example optical reference element installed. The optical reference element is mounted to a perimeter edge of primary optic 211 in notch 220. The optical reference element can emit reference beam 292 onto secondary mirror 212 for backpropagation through a set of downstream optics for the optical system. The perspective of FIG. 3 shows reference beam 292 originating from notch 220 and, after reflection by secondary mirror 212, backpropagating past primary optic 211 and into downstream optics. In this example, reference beam 292 is not incident onto primary mirror 211.

The optical reference element mounted into notch 220 comprises laser source connection 221, laser output element 222, and formatting lens 225. Laser source connection 221 comprises an optical link, waveguide, or other optical connection that carries laser energy from a laser source (not shown). In some examples, the laser source comprises a fiber-coupled laser, and a fiber optic link carries laser energy to an output element, namely laser output element 222. In this manner, the source components for a laser system that generate the optical energy used to create reference beam 292 can be located separately from primary mirror 211. This can aid in reduction of thermal/heat effects of the laser on primary mirror 211. For example, while laser output element 222 can be mechanically coupled to primary mirror 211, thermal regulation systems associated with the laser source can be thermally and vibrationally decoupled from primary mirror 211. Laser output element 222 can comprise one or more optical elements configured to receive optical energy from a fiber for transmission through free space or air. Laser output element 222 might comprise one or more apertures, collimators, lenses, or other optical components. Laser output element 222 can include mechanical components, such as connectors or fasteners, which mechanically couple laser source connection 221 into notch 220, and thus rigidly mount laser source connection 221 to structure 210 and primary mirror 211.

Formatting lens 225 is also coupled rigidly to laser output element 222 in notch 220 and receives optical energy from laser source connection 221, after any associated modification (such as collimation) by laser output element 222. Formatting lens 225 emulates or mimics the focal power of primary mirror 211. This can be achieved using a beam expander or convex lens as formatting lens 225, which focuses reference beam 292 according to a desired spreading factor that mimics reflection off of primary mirror 211. Formatting lens 225 makes reference beam 292 seem focused at some far-field point after reflecting off the secondary mirror 212 and emulates a pseudo guide star located at 'infinity'. Thus, reference beam 292 acts as if it was reflected by primary mirror 211 without actually needing to reflect off of primary mirror 211. Since there is a rigid mechanical coupling between laser output element 222 (and formatting lens 225) and primary mirror 211, emission of reference beam 292 can inherit the inertial properties of primary mirror 211 without having to reflect off the primary mirror 211.

The laser source (not pictured in FIG. 3) might produce an optical signal having a continuous wave (CW), modulated (AC), pulsed, or other property. The optical wavelength can be selected based on the desired application, transmissibility or reflectance of mirror/optic materials, and can be of the same or different wavelength as the primary beam. Typically, if the same wavelength is used as the primary beam, then a different modulation or beam property, such as polarization, is employed to differentiate the reference beam during backpropagation. Alternatively, the reference beam might be activated only when the primary beam is inactive, and vice-versa. Also, although a fiber-coupled laser source is discussed above, any suitable laser source can be employed, such as various types of fiber lasers, solid-state lasers, gas lasers, dye lasers, semiconductor lasers, diode lasers, vertical-cavity surface-emitting lasers (VCSELs), or free-electron lasers, among others. Suitable laser sources typically have beam-pointing jitter below a threshold level, and prevent or reduce parasitic coupling of vibration, heat, and force loading onto shared assemblies with primary optics or mirrors.

The rigid coupling discussed herein refers to a shared structure between primary mirror 211 and an optical reference element to form an assembly. Rotations, vibrations, positioning, pointing, and other inertial states that affect primary mirror 211 also affect the optical reference element in a similar manner Primary mirror 211 thus becomes an inertially-stabilized platform itself, when combined with inertial sensors, rotational compliant mounts, actuators, and a controller, and there no need for a separately inertially stabilized optical reference unit, as might be done in traditional architectures. The optical reference element, which is rigidly mounted to this inertially-stabilized primary mirror 211, behaves as a rigid-body extension of primary mirror 211 and is therefore also inertially stabilized. Primary mirror 211 is inertially stabilized using measurements produced by inertial sensors 219, which are also rigidly coupled to primary mirror 211 as a part of the assembly. Inertial sensors 219 are mounted to measure the rigid body rotations of primary mirror 211 and provide feedback for rate loop control of the pointing of primary mirror 211. Actuators (not shown in FIGS. 2-3) are used to pitch and yaw the entire assembly on torsional spring flexures which allow rotations orthogonal to the boresight of the assembly. Thus, the assembly may be slewed at a desired inertial line-of-sight rate. Because rigidly coupled reference beam 292 follows the pointing of primary mirror 211, any distortion in the downstream optical path caused by relative motion of downstream optics can be measured by reference beam 292. The rigid coupling ensures that any measurements of reference beam 292 will necessarily be with respect to primary mirror 211. This allows the optical reference signal to be used to indicate beam path errors for primary mirror 211, such as a jitter or distortions of secondary mirror 212 and other downstream optics corresponding to primary mirror 211. Advantageously, the use of the edge-mounted and rigidly coupled optical reference element eliminates separately mounted/stabilized optical reference units, eliminates associated layers of control for such separate units, and primary mirror 211 becomes an inertial reference platform.

Figure 4:
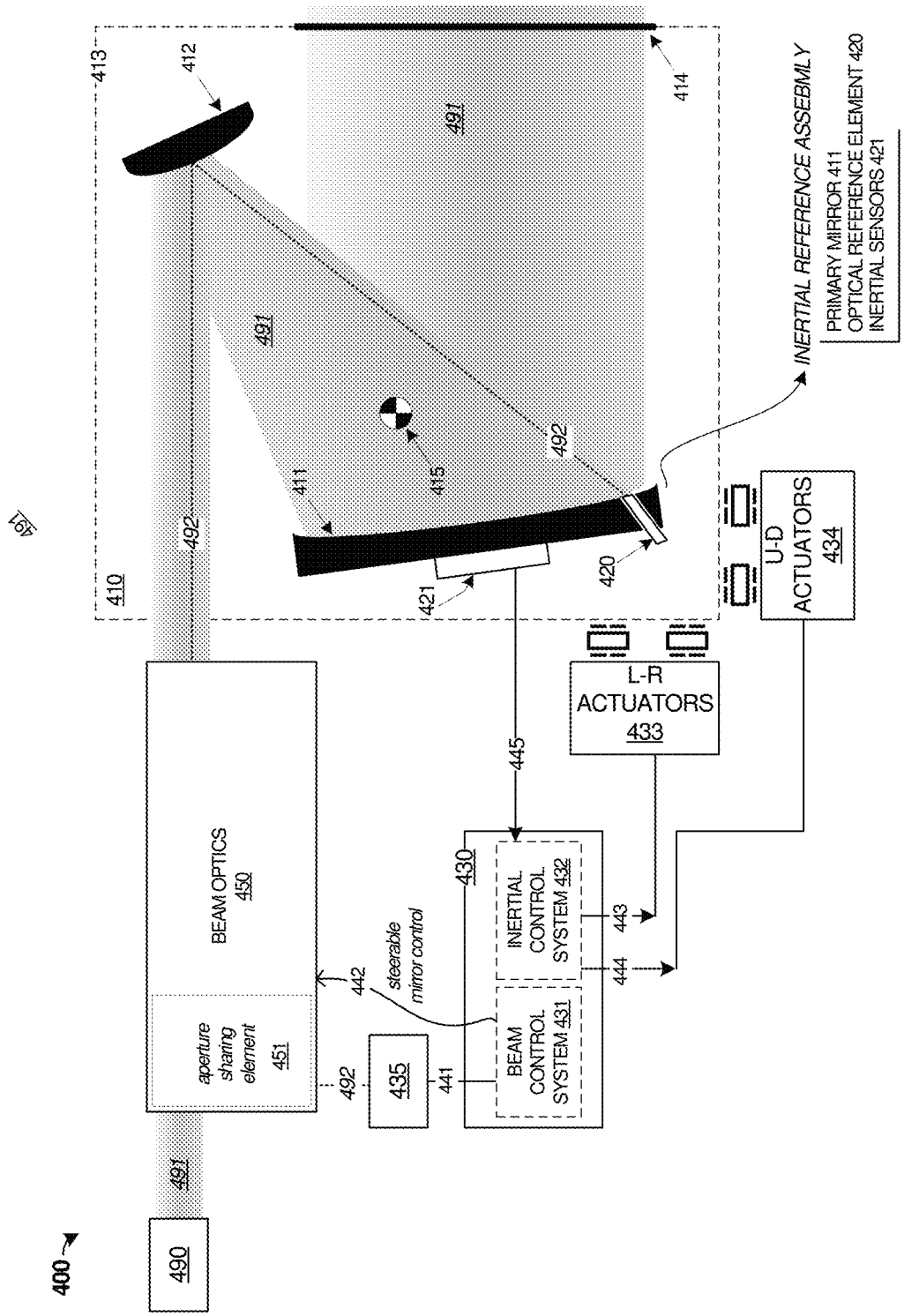
FIG. 4 illustrates a stabilization system in an implementation.

FIG. 4 illustrates an example system 400 comprising an optical emission device, such as an optical transmitter that can direct optical energy. FIG. 4 shows forward propagation of primary beam 491 and back propagation of reference beam 492—in the context of example downstream beam optics 450 and example control system elements. It should be understood that similar concepts apply to optical reception devices, such as telescopes. The example optical arrangement shown in FIG. 4 indicates an off-axis or oblique mirror arrangement between primary mirror 411 and secondary mirror 412. The off-axis mirror arrangement of FIG. 4 can be an example of the mirror arrangement of FIGS. 2-3, although variations are possible.

System 400 includes optical-mechanical assembly 410. Optical-mechanical assembly 410 includes primary mirror 411, secondary mirror 412, housing 413, and optical reference element 420. Optical-mechanical assembly 410 is mounted on rotationally compliant mounts, which are not pictured in FIG. 4 or FIG. 5 for clarity. The rotational axes of the mounts pass through the center of mass 415. Optical-mechanical assembly 410 can be integrated as part of a turret assembly (not shown) which provides gross pointing and can be carried by a vehicle or mounted in a stationary structure. Gross pointing of the turret assembly might be provided by movement apparatuses comprising motors, gears, actuators, or other actuation systems not pictured, although additional optic elements might be included in optical-mechanical assembly 410 in such examples. Fine adjustments for stabilization of optical-mechanical assembly 410 is provided by actuators 433-434. Actuators 433-434 are configured to exert moments via voice coil actuators on optical-mechanical assembly 410 in two axes to pitch and yaw the assembly about a center of mass 415 and within limits provided by corresponding compliant mounts. As will be discussed below, a feedback system is established which provides for enhanced stabilization of optical-mechanical assembly 410 using at least rotation sensors 421. Moreover, corrections to primary beam 491 can be made using measurements obtained by imaging reference beam 492 back-propagated through downstream beam optics 450.

Reference beam 492 is emitted by optical reference element 420 which is rigidly coupled to a structure of primary mirror 411. Thus, optical reference element 420 and primary mirror 411 are a part of the same assembly. Optical reference element 420 comprises components of a laser system, such as output elements of a fiber-coupled laser or semiconductor laser. Optical reference element 420 also includes a formatting lens that can be used to adjust the wavefront of reference beam 492, such as to mimic a focus (or prescription) of primary mirror 411. Other examples of a formatting lens adjust a focal property of reference beam 492 to diverge reference beam 492 to flood a greater portion of the aperture width of various downstream optic elements, or to alter a toe-in or centering of reference beam 492 on various downstream optics. When emitted by optical reference element 420, reference beam 492 propagates to secondary mirror 412 and is directed towards optical elements that feed primary mirror 411, referred to as backpropagation, with respect to the forward propagation of primary beam 491.

Turning first to the pathway for primary beam 491, primary mirror 411 comprises a parabolic, hyperbolic or ellipsoidal concave mirror which accepts optical energy from a parabolic, hyperbolic or ellipsoidal convex secondary mirror secondary mirror 412 and directs this optical energy towards a desired target. Secondary mirror 412 receives this optical energy generated by laser source 490 and reflected/refracted by one or more optics or optical components that form a propagation pathway for primary beam 491 before exiting optical-mechanical assembly 410 at aperture 414 or an associated window feature. Beam optics 450 form a common mode pathway that is at least partially shared by primary beam 491 and reference beam 492. Although not included in beam optics 450, secondary mirror 412 can be considered to be a part of the downstream optics from the perspective of optical reference element 420. From laser source 490, beam optics 450 receive primary beam 491 before propagation to secondary mirror 412. Beam optics 450 can include various optics and optical elements, such as components to fold a beam into a desired packaging arrangement or to direct primary beam 491 from offset or remotely located sources. Beam optics 450 can include one or more steerable or tilt-able optics which can correct for pointing jitter or distortions in primary beam 491. Beam optics 450 can include apertures, fast steering mirrors (FSMs), deformable mirrors, beam walk mirrors, and coudé mirrors, among other optic elements. Fast steering mirrors (FSMs) can be used for line of sight stabilization and alignment of primary beam 491. Deformable mirrors can provide wavefront control and correction of optical aberrations of primary beam 491. Aperture sharing element 451 is included in beam optics 450 and acts as a beam splitter which allows primary beam 491 to propagate in the forward direction while splitting off backpropagating reference beam 492 for measurement by further optical components. Aperture sharing element 451 might discriminate among reflection or passage of light beams based on various properties of the light, such as wavelength, polarization, or other properties.

Turning now to the pathway for reference beam 492, reference beam 492 is emitted by optical reference element 420 which transits to secondary mirror 412 which then backpropagates reference beam 492 through a set of beam optics 450 shared with primary beam 491 before reaching aperture sharing element 451. Upon reaching aperture sharing element 451, reference beam 492 is split from the same (common) pathway as primary beam 491 and propagates to reference imager 435. Reference imager 435 comprise sensors to detect and measure properties of the associated incident portions of reference beam 492 and output digital representations of these measurements to control system 430 over one or more links represented by link 441. In some examples, reference imager 435 comprises an angle sensor and a walk or position sensor.

Control system 430 includes two portions, namely beam control system 431 and inertial control system 432. Control system 430 comprises various circuitry or software to perform as discussed herein. Turning first to inertial stabilization, inertial control system 432 determines inertial stabilization adjustments that alter the rotation of optical-mechanical assembly 410. Inertial rotation sensors 421 indicate a current state of rotation of optical-mechanical assembly 410 about corresponding axes. Inertial control system 432 accepts indications of the current state of rotation from rotation sensors 421 over link 445 which are related to the inertial state of primary mirror 411. From these indications, inertial control system 432 determines one or more adjustments to the pointing of optical-mechanical assembly 410. Inertial control system 432 and rotation sensors 421 comprise a rate control loop that produces one or more stabilization command/control signals for actuators 433-434 over links 443-444 to rotate assembly 410 on compliant mounts about center of mass 415 with regard to two axes often referred to as pitch and yaw (e.g. up-down axis or left-right axis) to affect the rotation of the primary optical axis. Now turning to optical beam corrections, beam control system 431 determines optic adjustments to alter optical properties of primary beam 491 using controllable optics among beam optics 450 which might also include position control of secondary mirror 412 by the beam control system 431 for focus and beam pointing. Beam control system 431 receives indications of measurements of reference beam 492 after backpropagation through a set of optic components that feed primary mirror 411. Beam control system 431 accepts indications of optical properties from reference imager 435 over link 441. From these indications, beam control system 431 determines one or more adjustments to beam optics 450, such as commands noted for steerable mirror control 442. Beam control system 431 determines optical errors comprising distortions or jitter experienced by primary beam 491 through beam optics 450 using reference beam 492.

Figure 5:
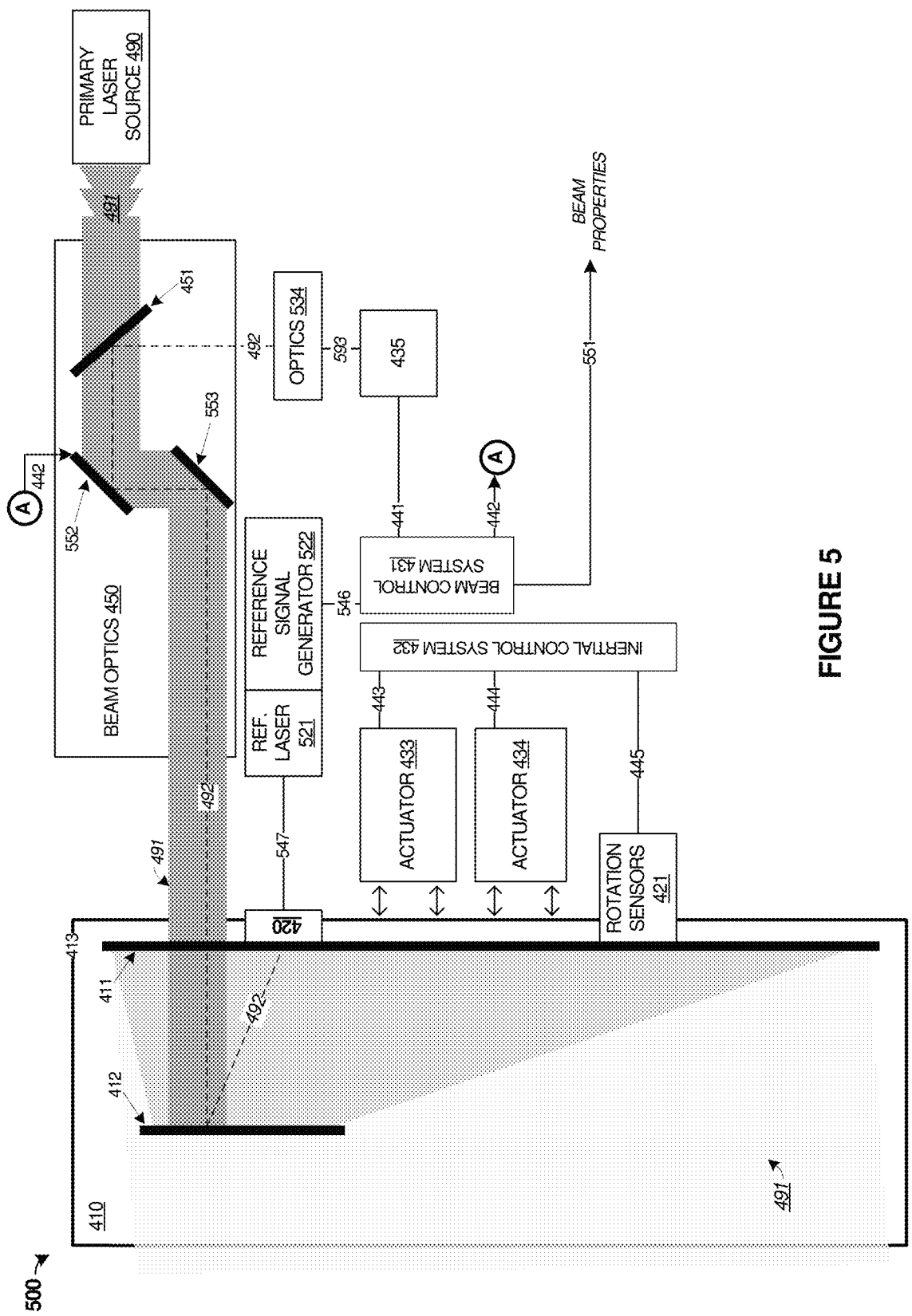
FIG. 5 illustrates a stabilization system in an implementation.

FIG. 5 is included to illustrate a schematic view of elements of FIG. 4, as well as include details on further elements of an electro-optical system omitted from FIG. 4 for clarity. FIG. 5 illustrates system 500 which includes an assembly comprising optical-mechanical assembly 410, housing 413, primary mirror 411, secondary mirror 412, optical reference element 420, and rotation sensors 421. Coupled to primary mirror 411 is optical reference element 420 which emits reference beam 492 for backpropagation through beam optics 450 that feed primary mirror 411. Optical reference element 420 and at least inertial rotation sensors 421 are rigidly coupled to primary mirror 411, which might include a structure formed by optical-mechanical assembly 410 and housing 413 that also is rigidly coupled to primary mirror 411.

Beam optics 450 include additional features in FIG. 5 to highlight some optic elements not shown in FIG. 4. Beam optics 450 include aperture sharing element 451, fast steering mirror 552, and additional optic 553, among other elements. These other elements might include secondary mirror focus and tilt control elements. Aperture sharing element 451, as mentioned above, can separate beams corresponding to primary beam 491 and reference beam 492, which directs reference beam 492 towards reference optics 534 and allows primary beam 491 to propagate normally. Fast steering mirror 552 can adjust beam tip and tilt according to commands issued over link 442 by beam control system 431. Additional optic 553 can include one or more of the various optic elements discussed herein, such as additional relay mirrors, fast steering mirrors, deformable mirrors, beam walk mirrors, and coudé mirrors, among other optic elements. Reference optics 534 include optic elements to prepare reference beam 492 for detection by reference imager 435. In some instances, reference optics 534 can include further mirrors or lenses to distinguish properties of reference beam 492, such as walk/position and angle properties indicated by reference beam 492. Reference optics 534 can provide one or more modified, replicated, refracted, or versions of reference beam 492 over link 593 to reference imager 435. Reference imager 435 can then image the versions of reference beam 492 and convert the optical properties into a digital or electronic format for delivery to beam control system 431 over link 441.

Actuators 433-434 can be commanded over links 443-444 by inertial control system 432, which may further include control circuitry to direct electrical power to the actuator elements based on control signaling. Actuators 433-434 can be linear actuators configured to push-pull creating moments over a relatively small angular range (typically less than 1 degree) along a particular axis and may comprise voice coil actuators controlled by an electrical signal. When optical-mechanical assembly 410 is mounted on a set of torsional spring flexure mounts or gimbal mounts, then optical-mechanical assembly 410 can be mated to the mount along an axis through the center of mass. This arrangement can rotate according to adjustments provided by actuators 433-434, as well as provide passive rotational disturbance rejection for optical-mechanical assembly 410. The torsional spring flexure mounts can act as a mechanical means for rejection of high frequency angular disturbances about a boresight of optical-mechanical assembly 410.

Figure 6:
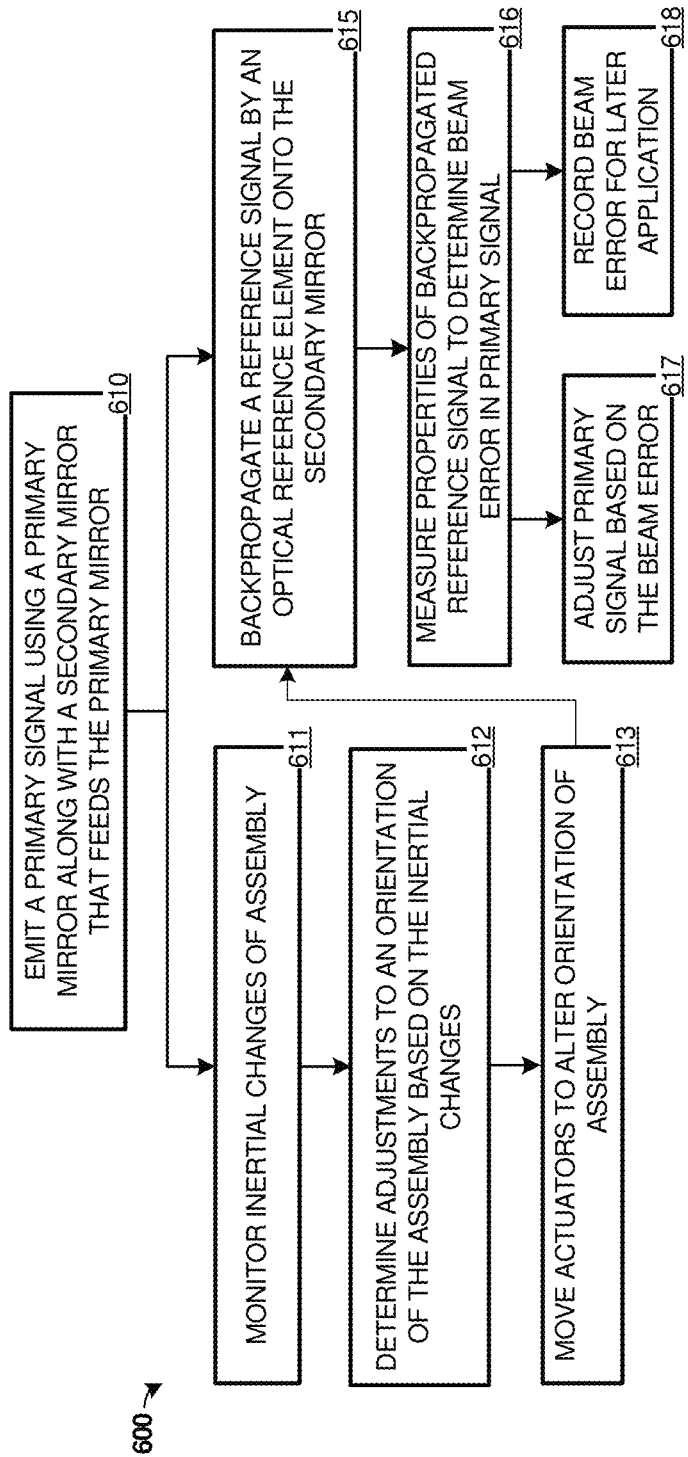
FIG. 6 illustrates a method of operating a stabilization system in an implementation.

Turning now to the operation of the elements of FIGS. 4-5, a flow diagram is presented in FIG. 6. FIG. 6 includes operations 600 that illustrate an example operation of a stabilized optical system. The operations of FIG. 6 can apply to any of the examples found in FIGS. 1-5, although variations are possible.

In operation 610, source 490 generates a primary signal for transmission through beam optics 450, secondary mirror 412, and for emission from primary mirror 411. This primary signal comprises primary beam 491 and is formed from optical energy of a selected wavelength or range or wavelengths. Source 490 comprises a primary laser source which can take various forms depending upon implementation. Various optics 450 route and direct the primary signal to secondary mirror 412. One or more among optics 450 might include fast steering mirrors or deformable mirrors to adjust properties of the primary signal, such as to correct for jitter, vibrations, distortions, or other unwanted effects on the primary signal during propagation. FIG. 5 shows example beam optics 450 as including fast steering mirror 552 and additional optic(s) 553. Additionally, aperture sharing element 451 is included to allow primary beam 491 to propagate to secondary mirror 412 while allowing one or more backpropagating reference signals to be split from a pathway followed by primary beam 491. Once primary beam 491 reaches secondary mirror 412, primary beam 491 is directed to primary mirror 411 for emission outward from optical-mechanical assembly 410. Although not shown in FIGS. 4-5, optical-mechanical assembly 410 is aimable or steerable using gross movement mechanisms to direct energy of primary beam 491 towards a selected object or target.

Concurrent with emission of primary beam 491, inertial control system 432 monitors (611) inertial properties of an assembly comprising primary mirror 411. In this example, primary mirror 411 is included in an assembly along with optical reference element 420 and rotation sensors 421. Thus, rotation sensors 421 can measure inertial changes of the assembly comprising primary mirror 411. Inertial changes can include rotational properties of the assembly in inertial space. Inertial rotation sensors 421 can measure rotational movement about two axes orthogonal to the optical axis. Since rotation sensors 421 are rigidly coupled to the assembly comprising primary mirror 411 and optical reference element 420, any inertial changes measured by rotation sensors 421 also correspond to that of primary mirror 411 and optical reference element 420. Rotation sensors 421 might comprise ring laser gyroscopes, fiber optic gyroscopes, MEMS rotation sensors, or other suitable rotation rate sensor technologies. Rotation sensors 421 can include analog to digital conversion circuitry to output a digital representation indicating the measured inertial changes over link 445 to inertial control system 432. More than one link 445 might be employed, such as one link for each among a set of rotation sensors.

From the indications of the inertial changes received from rotation sensors 421, inertial control system 432 can determine adjustments (612) to an orientation or rotation of the assembly. Inertial control system 432 comprises one or more control loops or rate control elements to slew the assembly at a desired inertial track rate. In earth-celestial observation examples, an optical system tracking a star or target might track at Earth Rate to remove the effect of rotation of the Earth. Inertial control system 432 can determine adjustments to the assembly that ensure that the magnitude of inertial rate errors as measured by rotation sensors 421 are below a desired threshold level. Non-zero inertial rate errors will thus be canceled out using the adjustments, and the adjustments correct for changes in drift experienced by the assembly. These adjustments determined by inertial control system 432 attempt to cancel out fine rotation rate errors in the assembly. Other additional mechanisms can be used to provide the gross movements of optical-mechanical assembly 410 which allow for coarse pointing and tracking of the assembly.

The adjustments indicate rotational moments (613) to be produced by actuators 433-434 to rotate the assembly about mounting points which alter the pointing of the assembly and consequently the rigidly coupled components (primary mirror 411, optical reference element 420, and inertial sensors 421, among others). As mentioned, these adjustments are made on top of gross movements which might be employed to aim or point optical-mechanical assembly 410 towards a target. Actuators 433 can produce tip movement for the assembly about a first axis, while actuators 434 can produce tilt movement for the assembly about a second axis orthogonal to the first axis. Inertial control system 432 indicates movement commands or control signals over links 443-444 to actuators 433-434. Actuators 433-434 can then produce the commanded changes in orientation to primary mirror 411. Since a feedback loop has been established using rotation sensors 421, periodic adjustments for the assembly can be made to affect an orientation of the assembly. These adjustments produce an inertially stable platform from which optical reference element 420 can operate. As seen in FIG. 6, while certain operations can occur in parallel, the inertially stabilized platform of the assembly allows reference beam 492 to be used to correct for changes in primary beam 491.

System 500 includes reference laser 521 which can backpropagate (615) a reference signal by optical reference element 420 onto secondary mirror 412. The reference signal is represented in FIG. 5 by reference beam 492. Beam control system 431 can indicate a property of the reference signal, such as a modulation, polarization, frequency/wavelength, pulse width, or other properties over link 546 to reference signal generator 522. These properties indicate to reference signal generator 522 to establish one or more laser beams having such properties, and reference laser 521 accordingly creates the reference signal for transfer over link 547. Link 547 might comprise an optical fiber or waveguide that propagates optical energy comprising the reference signal to optical reference element 420. Optical reference element 420 emits reference beam 492 based on the reference signal. As discussed herein, optical reference element 420 might comprise an output element for a fiber-coupled laser comprising reference laser 521. Optical reference element 420 also comprises a formatting lens which emulates an optical property of primary mirror 411 such that reference beam 492 acts as if it had been reflected by primary mirror 411 instead of emitted by optical reference element 420. Optical reference element 420 can be mounted to a perimeter, edge, or other location on primary mirror 411, and is rigidly coupled to for the assembly with primary mirror 411 and inertial rotation sensors 421.

Reference beam 492 is backpropagated from secondary mirror 412 through at least a portion or set of optics 450, and eventually propagates to aperture sharing element 451. Aperture sharing element 451 allows forward propagation of primary beam 491 while directing backpropagation of reference beam 492 toward reference optics 534. In many examples, reference beam 492 is backpropagated concurrently with forward propagation of primary beam 491. In such examples, aperture sharing element 451 can concurrently allow forward propagation of primary beam 491 while redirecting or reflecting backpropagating reference beam 492. Aperture sharing element 451 might comprise gratings or partially reflective mirrors to provide such operation. In further examples, reference beam 492 is not concurrent with primary beam 491, and aperture sharing element 451 might comprise a controllable mirror which only redirects reference beam 492 while reference beam is active. Other examples are possible depending upon the operation and properties of reference beam 492 and primary beam 491.

However, when reference beam 492 is active, beam control system 431 measures (616) properties of reference beam 492 after backpropagation through at least a portion of optics 450 (which includes secondary mirror 412) to determine beam error in primary beam 491. Due in part the inertially stabilized platform provided by the assembly, errors detected in reference beam 492 can correspond to errors in primary beam 491. Reference beam 492 is directed to reference optics 534 which may modify or condition reference beam 492 for measurement over optical link 593 by one or more elements of reference imager 435. Representations or indications of the measurements are indicated over link 441 to beam control system 431. Thus, reference imager 435 can comprise optical sensors which detect properties of reference beam 492 over optical link 593 and convert into electrical signaling or digital representations. Example measurements can include angle and walk/position properties of reference beam 492 after backpropagation. The angle properties indicate an angular measurement of the forward path comprising the path of reference beam 492 (and thus primary beam 491) relative to the boresight of the assembly. Reference imager 435 can comprise a beam sensor for angle in such cases. The angle is found by mapping a collimated beam (reference beam 492) onto a detector comprising reference imager 435. The centroid location of the spot formed on the detector by the collimated beam determines the angular error. In general, a lens (such as included in reference optics 534) maps angle to position in the focal plane for the collimated beam. Reference imager 435 can comprise beam sensors for walk/position.

The measured properties of reference beam 492 can be used by beam control system 431 to determine adjustments (617) to primary beam 491 using a fast steering mirror (FSM) 552 to correct for errors in at least the angle of primary beam 491. This correction in angle ensures that the optical axis 'boresight' of the assembly and primary beam 491 are aligned in angle. Because primary mirror 411 and optical reference element 420 are on the same inertially stabilized platform (using rotation sensors 421 and actuators 433-434), optical reference beam 492 can be measured to determine similar properties for primary beam 491. Thus, beam control system 431 attempts to null at least angle deviations between the optical reference beam 492 and primary beam 491, using reference beam 492 as a measurement proxy. With these corrections, beam control system 431 can correct for jitter, flexing, vibration, deformation, or other properties of the portion of optics 450 or secondary mirror 412 that backpropagate reference beam 492. In the example of jitter correction, disturbances to the reference beam 492 can be measured by beam control system 431. With FSM 552, beam control system 431 can typically achieve some rejection of jitter in the common path up to a few hundred Hz.

Instead of making adjustments to primary beam 491 using FSM 552 (or in addition to), the measured properties of reference beam 492 can be recorded or stored (618) by beam control system 431. Beam control system 431 can transfer indications of these measured properties of reference beam 492 over link 551. When system 400 or system 500 are employed as a remote sensor to measure or observe targets with primary beam 491 (instead of emission of energy), then the indications of these measured properties of reference beam 492 can be used at a later time to correct for distortions in images or videos captured by imaging equipment associated with the system. In observation or remote sensing applications, source 490 can be replaced by a detector element. These indications of these measured properties of reference beam 492 can comprise metadata that accompanies image data or video data that can be used by image/video processing equipment to reduce distortions from jitter, vibration, deformation, or other phenomena experienced by primary beam 491.

Figure 7:
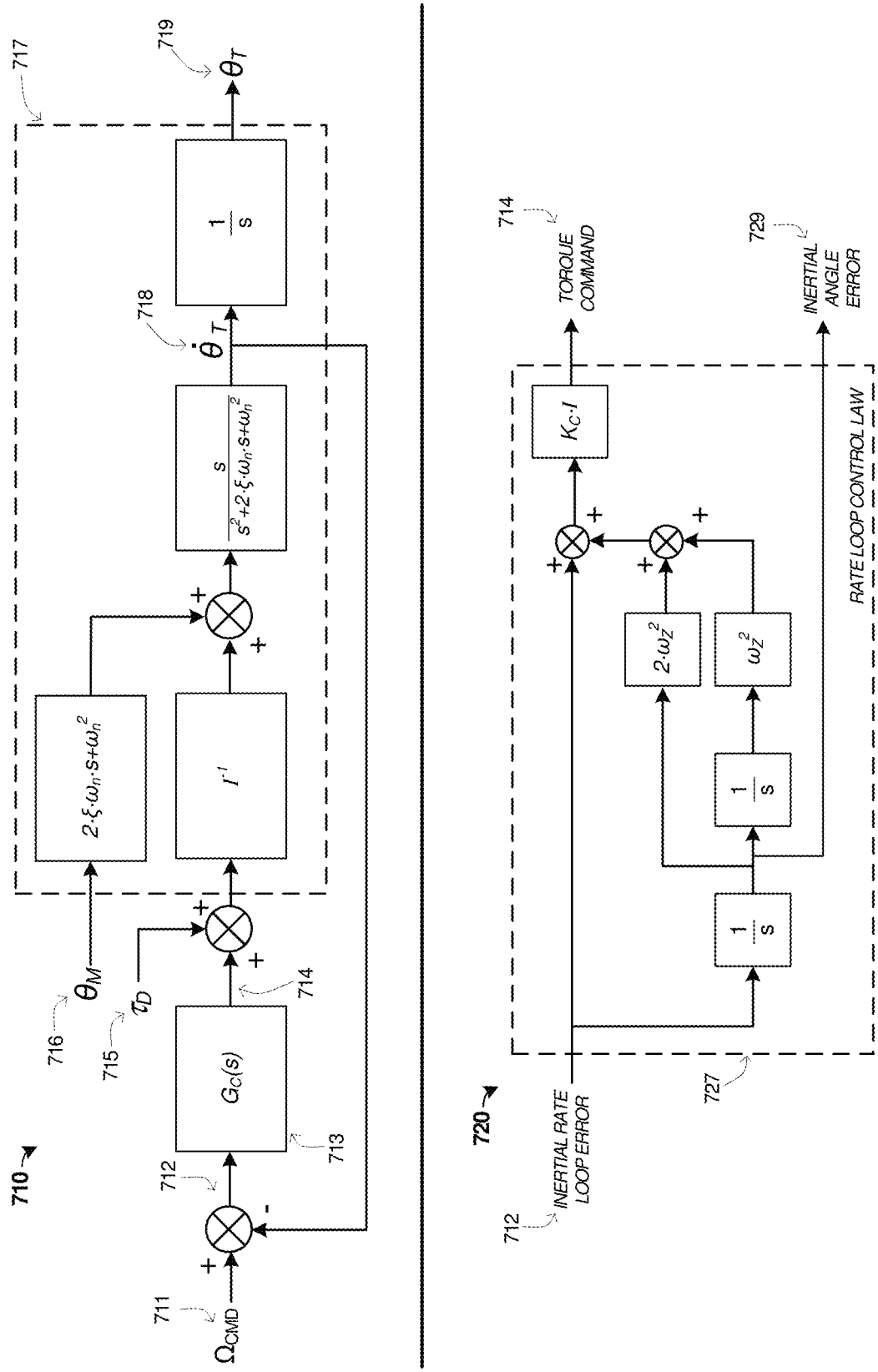
FIG. 7 illustrates stabilization control techniques in an implementation.

FIG. 7 is presented as one example of the inertial control loop and feedback processes discussed in FIG. 6 and performed by inertial control system 432. The operations of FIG. 7 can be applied to the other control systems that stabilize any assembly discussed herein. In FIG. 7, example 710 is one example control loop for inertial rate control, while example 720 comprises a rate loop control law that produces a torque command 714 an inertial angle error 729. Before discussing examples 710 and 720, various models of the electro-mechanical system for a telescope or directed energy device are discussed.

In an assembly isolation system model, torsional spring flexures can be employed to support the assembly, such as shown herein for the various conformal mounts. These torsional spring flexures can provide two orthogonal axes of angular motion. Assuming sufficient decoupling between the two axes of motion provided by the torsional spring flexures and ignoring parasitic modes, each axis of the torsional spring flexure system may be modeled by a second order linear differential equation for a resonant system, seen in equation [1]:

$$I \cdot \ddot{\theta}_T = -B \cdot (\dot{\theta}_T - \dot{\theta}_M) - K \cdot (\theta_T - \theta_M) + \tau \quad [1].$$

In equation [1], '$\theta_T$' refers to the assembly pointing angle (with respect to an inertial frame), '$\theta_M$' refers to an assembly mount angle (with respect to the inertial frame), '$\tau$' refers to torque between assembly and mount, 'B' refers to a torsional spring damping constant, 'K' refers to a torsional flexure spring constant, and 'I' refers to an assembly moment of inertial around torsional flexure. The inertial frame can be determined as the readings of inertial rotation sensors.

Re-arranging this equation [1] and taking the Laplace transform, the assembly pointing angle may be written as a function of the applied torque and mount angle disturbance, seen in equation [2]:

$$\theta_T(s) = \frac{I^{-1}}{s^2 + 2 \cdot \xi \cdot \omega_n \cdot s + \omega_n^2} \cdot \tau(s) + \frac{2 \cdot \xi \cdot \omega_n \cdot s + \omega_n^2}{s^2 + 2 \cdot \xi \cdot \omega_n \cdot s + \omega_n^2} \cdot \theta_M(s). \quad [2]$$

In equation (2), 's' refers to the Laplace variable, $$\omega_n \equiv \sqrt{\frac{K}{I}}$$

refers to the natural frequency (rad/sec) of the spring-inertia system, and $$\zeta \equiv \frac{B}{I} \cdot \left(\frac{1}{2 \cdot \omega_n}\right)$$

refers to the damping coefficient of the spring-inertia system. Taking equation (2) without any feedback/active control, it can be seen by analyzing the transmissibility functions versus frequency (normalized to the isolation system natural frequency) that the assembly tends to become isolated from mount motions at frequencies above the natural frequency. This will only be generally true to the extent that the system behaves like the simple spring-inertia model, so it is important to try and ensure that disturbance loads are coupled primarily through the mount (i.e. aerodynamic moments, parasitic moments, and mass imbalance on the suspended assembly system should ideally be minimized or eliminated through mechanical design).

Thus, leading to example 710 in FIG. 7, an 'inertial rate loop' may be closed around the assembly isolation system using rotation rate feedback from the inertial rotation sensors. Example 710 includes a block diagram for each axis of the control system (disregarding inertial sensor and actuator dynamics). In example 710, element 711 refers to the inertial rate command, element 712 refers to the inertial rate loop error, element 713 refers to the rate loop control law, element 714 refers to the torque command, element 715 refers to the torque disturbances, element 716 refers to the assembly mount angle motion, and element 717 represents a simple assembly dynamic model that includes several operations as shown and represents equation [2]. Element 718 refers to the assembly inertial rate, and element 719 refers to the assembly inertial angle.

For example 710, the open loop transfer function may generally be written as shown in equation [3]:

$$G_{OL}(s) = G_C(s) \cdot I \cdot \left(\frac{s}{s^2 + 2 \cdot \xi \cdot \omega_n \cdot s + \omega_n^2}\right), \quad [3]$$

and the loop error transfer function may be written as shown in equation [4]:

$$G_{ERR}(s) = \frac{1}{1 + G_{OL}(s)}. \quad [4]$$

The rate control law must both generally stabilize the system and have sufficiently large gain at (typically) low frequencies to provide the required error rejection. The rate control law may be realized by any number of classical or modern techniques and may be either continuous or discrete time. The Laplace equation for one example of a rate control law is shown in equation [5]:

$$G_C(s) = K_C \cdot I \cdot \frac{(s+\omega_z)^2}{s^2}. \quad [5]$$

In equation [5], '$K_C$' refers to a control loop gain constant, and '$\omega_z$' refers to the control loop compensating zeros. The (composite) mount disturbance rejection will generally be a product (sum in dB) of the rejection from passive isolation and active control. Representative parameters are chosen for the control law that will stabilize the loop. A similar situation is exhibited for disturbances introduced through parasitic torques. That is, high frequency disturbances will generally be rejected by the inertia of the system and low frequencies disturbances will be rejected by the active control system.

Finally, in example 720, one example inertial angle error (729) derived from the rate control loop is shown. The inertial angle error derived from the rate control loop, while generally small, represents the inability of the assembly to maintain the desired pointing in the presence of disturbance and provides additional information that can be used for pointing corrections using fast steering mirrors or other beam pointing control elements. Inertial angle error may be generally estimated by integrating the inertial rate loop error (712). An example rate control loop topology is one where the inertial angle error is generated as part of the rate loop control law (727). Integrators in the rate loop control law will be naturally bounded by the rate control loop. This eliminates problems with unbounded growth associated with the independent integration of the inertial rate error signal arising from initial conditions and numerical integration errors. An example of this is shown in example 720 for the reference control law given by equation [5], but it should be understood that such a topology generally exists for other control laws with integral gain. This inertial angle error may be corrected with various types of fast steering mirrors (FSMs) or other high bandwidth optical effectors in the downstream optics. This approach allows further rejection of the residual pointing error not rejected by passive isolation and active control. Generally, this 'feedforward technique' will be more effective if angle error is derived from low noise, high bandwidth inertial sensors in the rate control loop feedback.

Figure 8:
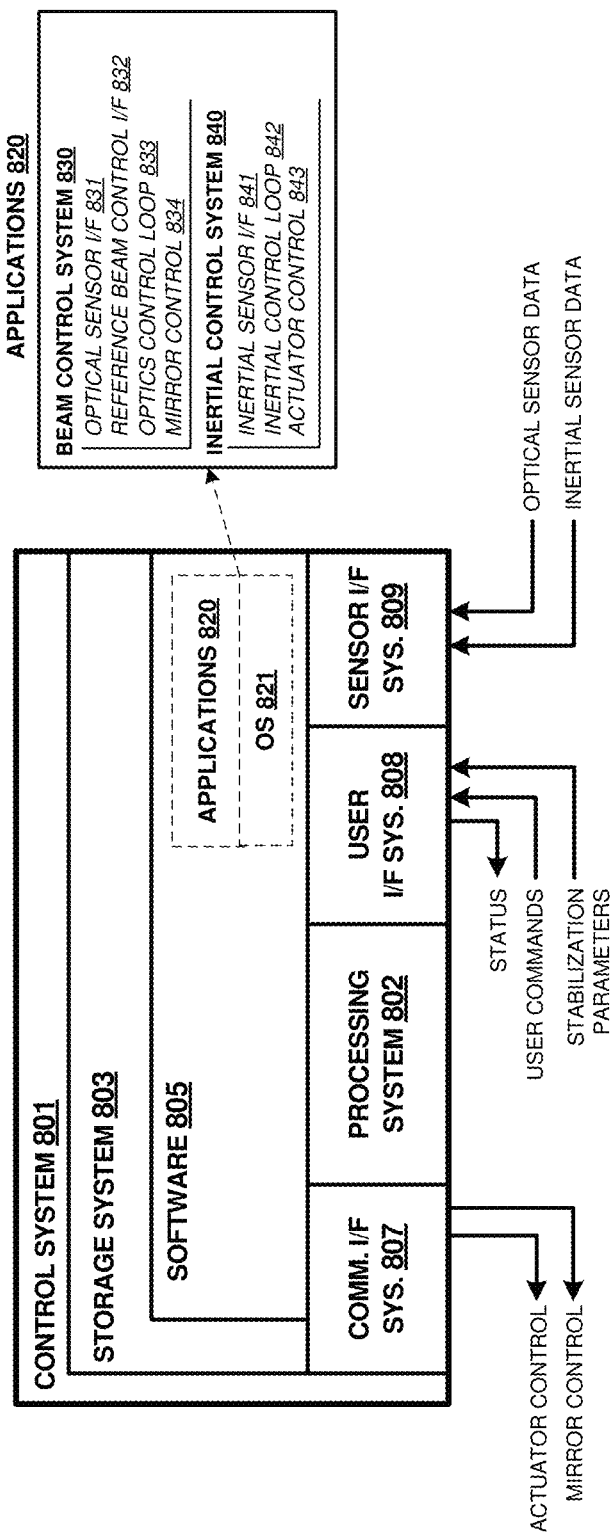
FIG. 8 illustrates a stabilization control system and software in an implementation.

FIG. 8 illustrates stabilization control system 800 and associated software 805 in an implementation. FIG. 8 illustrates control system 801 that is representative of any system or collection of systems in which the various operational architectures, scenarios, and processes disclosed herein may be implemented. For example, control system 801 can be used to implement elements of control system 130 of FIG. 1, elements of control systems 430-432 of FIGS. 4-5, or control elements of FIG. 7, although variations are possible.

Control system 801 may be implemented as a single apparatus, system, or device or may be implemented in a distributed manner as multiple apparatuses, systems, or devices. Control system 801 includes, but is not limited to, processing system 802, storage system 803, software 805, communication interface system 807, user interface system 808, and sensor interface system 809. Processing system 802 is operatively coupled with storage system 803, communication interface system 807, user interface system 808, and sensor interface system 809.

Processing system 802 loads and executes software 805 from storage system 803. Software 805 includes applications 820, which are representative of the processes, services, and platforms discussed with respect to the included Figures. When executed by processing system 802 to provide stabilization control and beam correction for electro-optical systems, among other services, software 805 directs processing system 802 to operate as described herein for at least the various processes, operational scenarios, and sequences discussed in the foregoing implementations. Control system 801 may optionally include additional devices, features, or functionality not discussed for purposes of brevity.

Referring still to FIG. 8, processing system 802 may comprise a micro-processor and processing circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 may be implemented in program instructions and among other functions may, when executed by processing system 802, direct processing system 802 to operate as described with respect to the various operational scenarios, sequences, and processes illustrated herein. For example, software 805 may include program instructions comprising applications 821 and operating system 821 that provide stabilization control and beam correction for electro-optical systems, among other services. In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software or other application software, in addition to or that include applications 820. Software 805 may also comprise firmware or some other form of machine-readable processing instructions executable by processing system 802.

Software 805, when loaded into processing system 802 and executed, may transform a suitable apparatus, system, or device (of which control system 801 is representative) overall from a general-purpose computing system into a special-purpose computing system customized to provide stabilization control and beam correction for electro-optical systems, among other services. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors. For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Applications 820 can include beam control system 830 and inertial control system 840. Beam control system 830 includes optical sensor interface 831, reference beam control interface 832, optics control loop 833, and mirror control 834. Inertial control system 840 includes inertial sensor interface 841, inertial control loop 842, and actuator control 843.

Turning first to beam control system 830, optical sensor interface 831 communicates with optical sensors. Optical sensor interface 831 receives indications of optical measurements made on backpropagated reference signals or reference beams, such as measurements determined by reference imager 435 in FIG. 4-5. Optical sensor interface 831 can provide these indications of the measurements to optics control loop 833 for processing into one or more control outputs or command outputs for adjusting steerable optic elements, such as one or more FSMs. These control or command outputs can be provided by mirror control 834 to steerable optic elements. Reference beam control interface 832 communicates with a laser system which generates and propagates a reference beam. For example, reference beam control interface 832 can communicate with optical reference element 120 in FIG. 1, a laser source associated with laser source connection 222 or laser output element 222 in FIG. 2, optical reference element 420 in FIG. 4, and reference signal generator 522 in FIG. 5. Reference beam control interface 832 determines and transfer instructions related to one or more modulation, polarization, frequency, wavelength, pulse width, or other properties over link 546 to control reference signal generator 522.

Turning now to inertial control system 840, inertial sensor interface 841 can receive indications of rotational measurements determined by sensor 115 in FIG. 1, sensors 219 in FIG. 2, or rotation sensors 421 in FIGS. 4-5. Inertial control loops 842 comprise one or more control processes or operations that form a stabilization system for an assembly of a remote sensing device or optical transmission device. Inertial control loops 842 have at least one control input comprising measurements by inertial sensors, such as inertial rotation sensors coupled to an assembly. Inertial control loops 842 might include a first control scheme to determine adjustments of the orientation or pointing of an assembly based on measurements determined from the one or more inertial sensors. In this first control scheme, an inertial adjustment mechanism is configured to produce adjustments to an orientation of at least an assembly using actuators configured to provide movement for the assembly about at least two axes. One or more feedback loops, and control loops, such as seen in FIG. 7, can be employed to slew at a desired rate for an assembly. Inertial control loops 842 can communicate with actuator control 843 to command actuators to alter an orientation or pointing of a primary mirror.

Communication interface system 807 may include communication connections and devices that allow for communication with other computing systems or electrical components (not shown) over communication links or communication networks (not shown). Examples of connections and devices that together allow for inter-system communication may include transceivers, network interface controllers, antennas, power amplifiers, RF circuitry, and other communication circuitry. The connections and devices may communicate over communication media to exchange communications with other computing systems or networks of systems, such as metal, glass, air, or any other suitable communication media. Physical or logical elements of communication interface system 807 can receive link/quality metrics and provide link/quality alerts or dashboard outputs to users or other operators.

Communication interface system 807 may include portions of sensor system interface 809. Sensor system interface 809 comprises various hardware and software elements for interfacing with optical sensors and inertial sensors, such as transceiver equipment. Analog-to-digital conversion equipment, filtering circuitry, data processing elements, or other equipment can be included in sensor system interface 809.

Communication between control system 801 and other elements or systems (not shown), may occur over communication links or communication networks and in accordance with various communication protocols, combinations of protocols, or variations thereof. For example, control system 801 when implementing a control device, might communicate with sensor elements over corresponding digital communication links comprising Ethernet interfaces, serial interfaces, serial peripheral interface (SPI) links, inter-integrated circuit (I2C) interfaces, universal serial bus (USB) interfaces, UART interfaces, or wireless interfaces. When network links are employed, examples networks include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some network communication protocols that may be used include, but are not limited to, the Ethernet, Internet protocol (IP, IPv4, IPv6, etc. . . . ), the transmission control protocol (TCP), and the user datagram protocol (UDP), as well as any other suitable communication protocol, variation, or combination thereof.

User interface system 808 may include a software or virtual interface such as a terminal interface, command line interface, or application programming interface (API). User interface system 808 may also include physical user interfaces, such as keyboard, a mouse, a voice input device, or a touchscreen input device for receiving input from a user. Output devices such as a display, speakers, web interfaces, terminal interfaces, and other types of output devices may also be included in user interface system 808. User interface system 808 can provide output and receive input over a network interface, such as communication interface system 807. In network examples, user interface system 808 might packetize data for receipt by a display system or computing system coupled over one or more network interfaces. User interface system 808 may comprise API elements for interfacing with users, other data systems, other user devices, web interfaces, and the like. User interface system 808 may also include associated user interface software executable by processing system 802 in support of the various user input and output devices discussed above. Separately or in conjunction with each other and other hardware and software elements, the user interface software and user interface devices may support a console user interface, graphical user interface, a natural user interface, or any other type of user interface.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials, manufacturing processes, and propellants discussed herein are employed according to the descriptions above. However, it should be understood that the disclosures and enhancements herein are not limited to these materials, manufacturing processes, and propellants, and can be applicable across a range of suitable materials, manufacturing processes, and propellants. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A system, comprising:
   an optical reference element rigidly coupled to a primary mirror and configured to propagate a reference signal for optical beam error determination through optic elements that form at least a portion of an optical beam path corresponding to the primary minor; and
   an adjustment mechanism configured to produce rotational adjustments of an assembly comprising the optical reference element and the primary mirror that correct for disturbance or drift of the assembly based at least on inertial rotation properties measured for the assembly, wherein the rotational adjustments are produced about at least two axes orthogonal to an optical axis associated with the primary mirror.

2. The system of claim 1, comprising:
   a measurement system configured to perform a measurement of the reference signal after propagation through the optic elements to determine the optical beam error associated with the optical beam path; and
   a control system configured to adjust at least one of the optic elements among the optical beam path based on the measurement of the reference signal.

3. The system of claim 1, comprising:
   inertial sensors rigidly coupled to the assembly and configured to measure inertial rotation properties of the assembly; and
   a control system configured to determine the rotational adjustments that correct for the disturbance or the drift of the assembly based at least on the inertial rotation properties.

4. The system of claim 1, wherein the adjustment mechanism comprises non-contact actuators configured to produce rotation of the assembly about the two axes.

5. The system of claim 1, comprising:
   rotationally compliant mounts coupled to the assembly that are configured to passively attenuate rotational disturbances experienced about the two axes of the assembly above a threshold frequency.

6. The system of claim 1, wherein the rotational adjustments are further employed to provide pointing corrections to a pointing control actuator among the optic elements.

7. The system of claim 1, comprising:
   a first portion of the optic elements rigidly coupled to the assembly and move with the assembly, and a second portion of the optic elements decoupled from movement of the assembly.

8. The system of claim 1, wherein the optical reference element comprises a formatting lens configured to adjust a focal property of the reference signal.

9. The system of claim 1, wherein the optical reference element comprises an output element of a fiber coupled laser or a semiconductor laser element.

10. A method, comprising:
    emitting, by an optical reference element rigidly coupled to a primary mirror, a reference signal for optical beam error determination through optic elements that form at least a portion of an optical beam path corresponding to the primary mirror; and
    producing rotational adjustments of an assembly comprising the optical reference element and the primary mirror that correct for disturbance or drift of the assembly based at least on inertial rotation properties measured for the assembly, wherein the rotational adjustments are produced about at least two axes orthogonal to an optical axis associated with the primary mirror.

11. The method of claim 10, further comprising:
    measuring the reference signal after propagation through the optic elements to determine the optical beam error associated with the optical beam path; and adjusting at least one of the optic elements among the optical beam path based on measurement of the reference signal.

12. The method of claim 10, further comprising:
measuring the inertial rotation properties of the assembly inertial sensors rigidly coupled to the assembly; and
determining, in a control system, the rotational adjustments to correct for the disturbance or the drift of the assembly based at least on the inertial rotation properties.

13. The method of claim 10, comprising:
with rotationally compliant mounts coupled to the assembly, passively attenuating rotational disturbances experienced about the two axes of the assembly above a threshold frequency.

14. The method of claim 10, wherein the rotational adjustments are further employed to provide pointing corrections to a pointing control actuator among the optic elements.

15. The method of claim 10, wherein a first portion of the optic elements rigidly is coupled to the assembly and move with the assembly, and a second portion of the optic elements is decoupled from movement of the assembly.

16. The method of claim 10, wherein the optical reference element comprises a formatting lens configured to adjust a focal property of the reference signal.

17. The method of claim 10, wherein the optical reference element comprises an output element of a fiber coupled laser or a semiconductor laser element.

18. An optical-inertial stabilization system, comprising:
a rotationally suspended opto-mechanical assembly comprising an optical reference element, inertial sensors, and a primary optic configured to direct an optical beam;
the optical reference element configured to propagate a reference signal through optic elements that form at least a portion of an optical beam path corresponding to the primary optic;
the inertial sensors configured to measure inertial rotation properties of the rotationally suspended assembly;
rotationally compliant mounts coupled to the rotationally suspended assembly and configured to passively attenuate rotational disturbances above a threshold frequency experienced about two axes orthogonal to an optical axis associated with the primary optic;
a measurement system configured to perform a measurement of the reference signal after propagation through the optic elements to determine an optical beam error associated with the optical beam path;
an optical control system configured to adjust at least one of the optic elements among the optical beam path based on the measurement of the reference signal;
an inertial control system configured to determine rotational adjustments to correct for disturbance or drift of the rotationally suspended assembly based at least on the inertial rotation properties; and
an adjustment mechanism configured to produce the rotational adjustments of the rotationally suspended assembly about the two axes.

19. The system of claim 18, wherein the rotational adjustments are further employed to provide pointing corrections to a pointing control actuator among the optic elements.

20. The system of claim 18, wherein the optical reference element comprises an output element of a fiber coupled laser or a semiconductor laser element.

* * * * *